United States Patent
Champion et al.

(10) Patent No.: US 6,774,953 B2
(45) Date of Patent: Aug. 10, 2004

(54) METHOD AND APPARATUS FOR COLOR WARPING

(75) Inventors: Mark Champion, Kenmore, WA (US); Yoshiyuki Akiyama, Kawasaki (JP); Katsura Kodama, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 404 days.

(21) Appl. No.: 09/870,595

(22) Filed: May 31, 2001

(65) Prior Publication Data

US 2003/0016305 A1 Jan. 23, 2003

(51) Int. Cl.[7] .................................................. H04N 9/64
(52) U.S. Cl. ...................................... 348/651; 348/453
(58) Field of Search ................................ 348/649, 651, 348/652, 453; 345/600–604; 382/167; 358/518, 524

(56) References Cited

U.S. PATENT DOCUMENTS

| | | | | | |
|---|---|---|---|---|---|
| 5,369,450 | A | * | 11/1994 | Haseltine et al. | 348/745 |
| 5,440,352 | A | * | 8/1995 | Deter et al. | 348/750 |
| 6,151,135 | A | * | 11/2000 | Tanaka et al. | 358/1.9 |

* cited by examiner

Primary Examiner—Victor R. Kostak
(74) Attorney, Agent, or Firm—Miller Patent Services; Jerry A. Miller

(57) ABSTRACT

A method and apparatus for transforming color signals. The transformation is achieved by use of a first, coarse, look-up table and a second look-up table that provides coefficients to be used in calculating a correction vector. The vector of color components from the first look-up table is added to the correction vector to provide the transformed vector. The method and apparatus have particular application in the display of digital video signals.

22 Claims, 5 Drawing Sheets

METHOD AND APPARATUS FOR COLOR WARPING

FIELD OF THE INVENTION

This invention relates generally to the processing of digital video signals and in particular to color transformation.

BACKGROUND OF THE INVENTION

In the human eye, color vision is provided by discrete receptors called cones, which are distributed across the central portion of the retina known as the fovea. There are three types of cones; each type is most responsive to light with wavelengths corresponding to one of the primary colors: red, green or blue. What is perceived as colored light is actually a mixture of light of different wavelengths, described by a spectral power distribution (SPD). Color reproduction uses the theory of tristimulus, which states that any color can be reproduced by stimulating the cones in the same way as the original SPD. A video camera captures a scene in separate image planes using filters of red, green and blue, and recording the intensity of each color. These intensities are labeled as R, G and B, respectively.

A cathode ray tube (CRT) is commonly used to display color images. The face of a CRT is covered with dots of phosphor that emit light in the range of the three primary colors when stimulated by an electron beam. Each phosphor dot emits a range of wavelengths and each cone responds in some degree to a range of colors, so it is not possible to manipulate the primary colors independently. Further, the phosphor dots have a non-linear response. To compensate for this non-linearity, the inverse of this response, known as a gamma response, is often applied in the video camera. A description of the gamma response is given in the International Telecommunications Union (ITU) specification ITU Rec. 709, for example. The gamma corrected video signals are labeled R', G' and B'.

Early video signals were primarily used for monochromatic (black and white) television. For this application, only the total intensity of the light was required. When color television was introduced, it was desirable to maintain compatibility with older television receivers, so rather than transmitting the R', G' and B' signals, a total luminescence signal, Y', and two color difference signals are used. The R', G' and B' signals can be calculated from these three signals if required. For example, in digital video we have $$Y' = a.R' + b.G' + c.B'$$

$$C_r = S_r.(Y' - R') + d$$

$$C_b = S_b.(Y' - B') + d,$$

where a, b, and c are the proportional responses of each color and $S_r$, $S_b$ and d are scaling factors to keep the components within a specific range. These equations are known as the luma equations and can be written in matrix form as $$\begin{bmatrix} Y' \\ C_r - d \\ C_b - d \end{bmatrix} = M \begin{bmatrix} R' \\ G' \\ B' \end{bmatrix},$$

where M is the 3×3 matrix $$M = \begin{bmatrix} a & b & c \\ S_r(a-1) & S_r b & S_r c \\ S_b a & S_b b & S_b(c-1) \end{bmatrix}.$$

Different types of color reproduction devices will have different color-reproducing characteristics, called color spaces. In order to describe colors without reference to a particular device, a device-independent color space was defined by the 1931 CIE Standard Observer study. The study defined three mathematical primary X, Y and Z that can be used to define all observable colors. In this case, Y is the luminescence and X and Y are idealized chromaticity primaries. Chromaticity is usually defined in terms of the normalized coordinates $$x = \frac{X}{X + Y + Z} \quad \text{and}$$

$$y = \frac{Y}{X + Y + Z}.$$

The characteristics of a device can then be specified if the x and y values of the device primaries are known.

In particular, these definitions and relationships make it possible to convert color video signals intended for one device into color video signals for another device.

Many digital video signals are configured so that they will reproduce accurate colors when viewed on a device that operates in accordance with ITU Recommendation 709. These signals are designed to compensate for the characteristics of a phosphor-based CRT. If a different display, such as a display that uses laser light sources, is to be used, the signals must be transformed. This transformation process requires a combination of linear and non-linear computations, which are described in more detail below. In order to perform these computations in real-time, a powerful and therefore expensive, signal processor is required.

Conventional color transformation schemes may be used to correctly map colors from one device to another. However, a laser light display has a much greater range (gamut) of colors than a traditional CRT display. In order to utilize this extended color gamut, a more complicated, possibly non-linear transformation is required. The computation may be avoided by use of a look-up table, but to store all combinations for 8-bit encoded colors would require $2^{24}$ memory locations each holding 24 bits of information, i.e. 48 MB (MegaBytes) of memory. This size of memory is impractical. This use of a powerful video computer to perform these calculations is described in "Colorimetry in the TeraNex Video Computer", by Linc Brookes, TeraNex publication, 1999. The approach recommended in this publication is to define the non-linear warping of the color space between reference points. However, this requires thousands of multiplications for each pixel.

SUMMARY OF THE INVENTION

It is accordingly an object of the invention to provide a method and an apparatus for transforming video signals having reduced computation and memory requirements. The transformation may be linear or non-linear. Each pixel in the video image is represented by a vector of color components. According to the present invention, each vector of color components is transformed or warped to facilitate display on a specified device.

The transformation system of the invention uses a primary look-up table containing vectors of reference output components indexed by a table index, and a secondary look-up table containing matrices of coefficients indexed by the table index. The look-up table is stored in a memory. An index generator receives the vector of input components and generates a table index value corresponding to a reference input color and a vector of difference components representing the difference between said vector of input components and said reference input color. A correction calculator generates a vector of correction components dependent upon the vector of difference components and the matrix of coefficients indexed. The vector of reference output components are added to the vector of correction components to obtain a vector of transformed input components.

According to the method of the invention, a vector of input components (R,G,B) of an input color is transformed by generating a table index using the vector of input components, the table index corresponding to a reference input color $(R_0,G_0,B_0)$, retrieving a vector of reference output components from a primary look-up table using the table index, retrieving a matrix M of coefficients from a secondary look-up table using the table index, generating a vector of difference components (r,g,b) representing the difference between the vector of input components (R,G,B) and the reference input color $(R_0,G_0,B_0)$, calculating a vector of correction components $\underline{F}$(r,g,b) using the vector of difference components and the matrix of coefficients, and adding the vector of correction components to the vector of reference output components to obtain a vector of final output components of an output color.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

Figure 1:
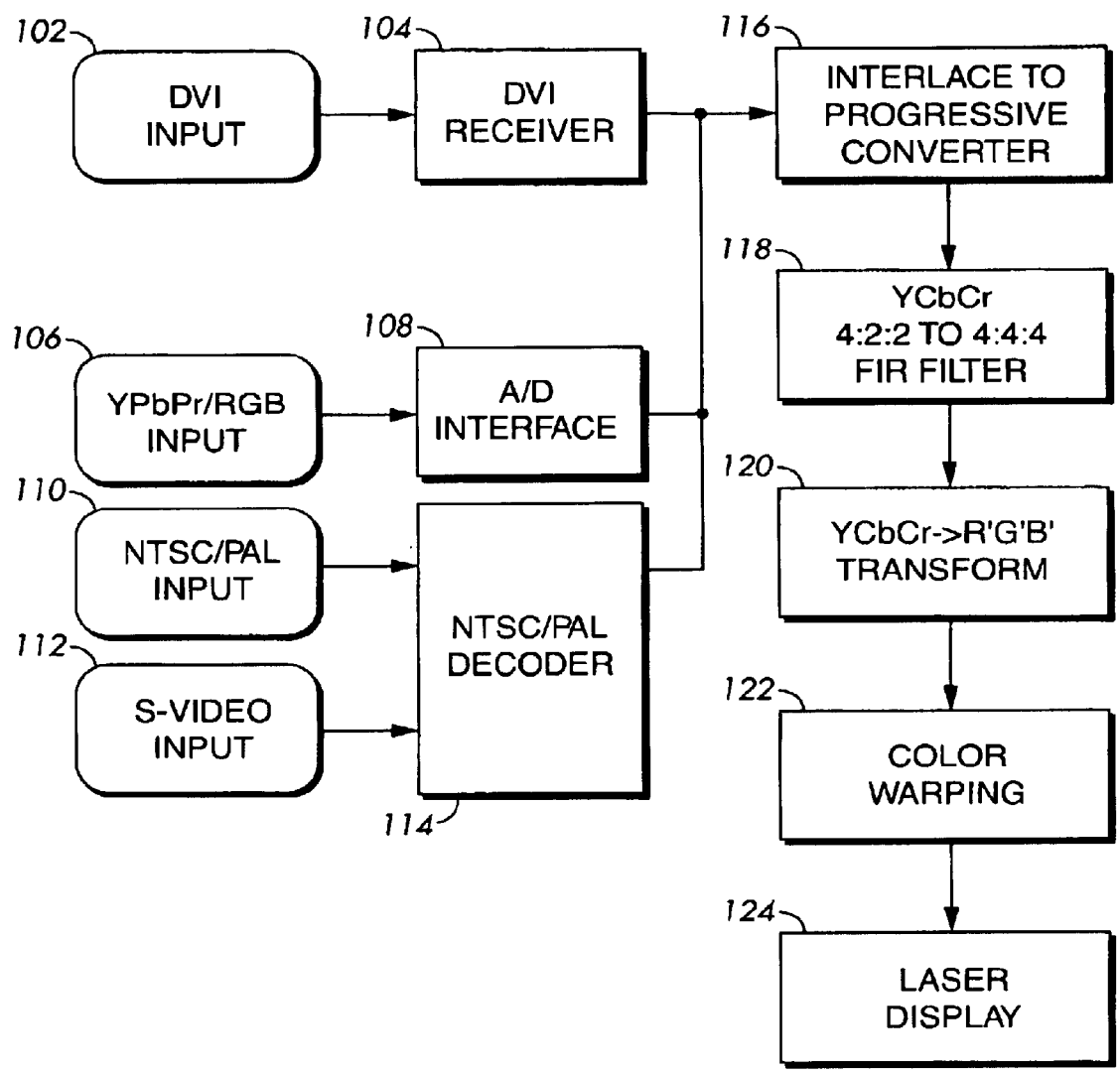
FIG. 1 is a block diagram of an exemplary video processing architecture in accordance with the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

By way of example, the invention will be described with respect transforming colors in the color space defined by ITU Rec. 709 to monochromatic colors provided by red, green and blue lasers. Such laser as used in laser video projection displays. However, it is to be understood that the invention may be used to transform between any two color spaces.

A block diagram of the architecture of an exemplary video processor 100 is shown in FIG. 1. Video signals may be received via any of a number of inputs. Digital Video Input (DVI) 102 is received via DVI receiver 104. Analog video input 106 in YPbPr or RGB format is received at A/D (analog to digital) interface 108, where the analog signals are converted to digital signals. NTSC and PAL inputs 110 and S-Video input 112 are received by decoder 114. These signals are configured for an interlaced display. They are converted to a non-interlaced, progressive format at converter 116. The spatial sampling rate for the horizontal difference signal is typically half that of the vertical difference and luminescence signals. This sampling rate is increased by inserting samples with an FIR smoothing filter at 118. At 120 the signals are converted from YCbCr format to R'G'B' format. These signals are in the format recommended by ITU Rec. 709.

The range (gamut) of colors available in a laser projection system is much larger than for traditional CRT displays. However, most video content is intended for display using traditional CRT displays, which have a limited color gamut (defined by ITU Rec. BT709). If this video content were directly displayed on a laser light system, the colors, particularly the shades of white and flesh tones, would be incorrect and would degrade the viewing experience. This video content is therefore transformed (morphed) in color warping block 122. A conventional linear transformation scheme (discussed below with reference to FIG. 2) will map the colors correctly, but will not utilize the extended color gamut available with laser light. The transformation scheme of the current invention enables the extended color gamut to be used. The outputs from color warping block 122 are R'G'B' signals corrected for use with the laser projection system. The present invention is primarily concerned with the operation of this block, so it will be discussed in more detail below. The R'G'B' signals are passed to laser display 124. The laser display may perform further processing of the video signal to compensate for the spatial characteristics of the display system, such as image scaling and lens aberration.

Figure 2:
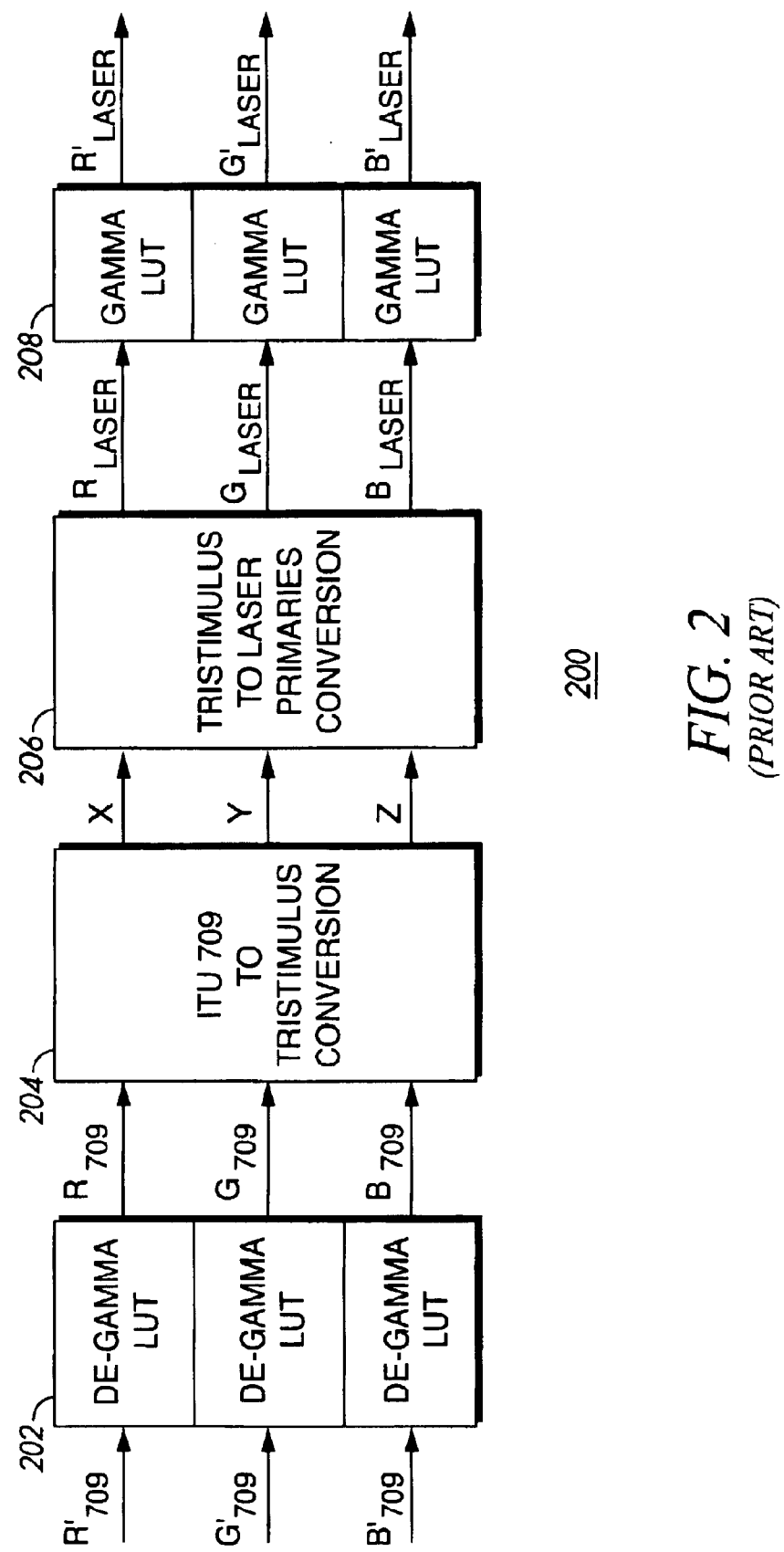
FIG. 2 is a block diagram of a color transformation system of the prior art.

FIG. 2 shows a block diagram of a conventional linear color transformation scheme 200. The three incoming signals, $R'_{709}$, $G'_{709}$, $B'_{709}$, are assumed to be in ITU Rec. 709 format. The first step in the transformation is to remove the gamma transform that was applied at the source to compensate for the CRT response. This is done for each signal independently. For example, for the $R'_{709}$ signal, $$R_{709} = \frac{R'_{709}}{4.5} \qquad \text{for } R'_{709} \le 20$$

$$R_{709} = 256 * \left[\frac{\frac{R'_{709}}{256} + 0.099}{1.099}\right]^{1/\gamma} \qquad \text{for } R'_{709} > 20$$

where $\gamma=0.45$. Applying this to an example color with R'G'B' coordinates $C'_{709}=(220,30,45)$ gives RGB coordinates $C_{709}=(189.59,6.91,11.78)$. This transformation is carried out using a look-up table (LUT) shown as 202 in FIG. 2. The next two stages of the transformation process are a conversion to absolute tristimulus (XYZ) coordinates at block 204 followed by a conversion to RGB coordinates for the primary sources of the laser system at block 206. These primary signals are labeled as $R_L$, $G_L$ and $B_L$. Each of these steps involves a multiplication by a 3×3 matrix of coefficients. Since this is a linear process, the two matrices can be pre-multiplied, so blocks 204 and 206 may be combined as a single transformation. An example for conversion from ITU 709 to laser primaries is:

$$\begin{bmatrix} R_L \\ G_L \\ B_L \end{bmatrix} = \begin{bmatrix} 0.6567 & 0.3408 & 0.0025 \\ 0.0798 & 0.8618 & 0.0584 \\ 0.0160 & 0.0879 & 0.8962 \end{bmatrix} * \begin{bmatrix} R_{709} \\ G_{709} \\ B_{709} \end{bmatrix}$$

The RGB coordinates of the example color, relative to the laser primaries, are $C_L$=(126.88,21.77,14.2). Finally, the gamma transformation is reapplied to each signal, at block 208. For the red signal, for example, $$R'_L = 4.5 R_L \quad \text{for } R_L \leq 4.5$$

$$R'_L = 256 * \left[1.099 * \left(\frac{R_L}{256}\right)^\gamma - 0.099\right] \quad \text{for } R_L > 4.5$$

Applying this equation to the example color gives $C'_L$=(179.46,67.36,51.16).

In the conventional color transformation scheme, described above with reference to FIG. 2, the transformation between the pre-gamma RGB signals is linear and is applied using a matrix multiplication. Since the gamma modified signals are effectively compressed, the pre-gamma RGB signals must be stored at a higher precision than the R'G'B' signals. This increases the amount of computation required to perform the matrix multiplication. In order to make use of the extended color gamut of a laser projection system, and to match the correct white point and flesh tones, a non-linear transformation is required. The transformation may be accomplished by use of a look-up table, but to store all combinations for 8-bit encoded colors would require $2^{24}$ memory locations each holding 24 bits of information, i.e. 48 MB of memory. This size of memory is impractical. Accordingly, the present invention provides a transformation scheme that requires considerably less memory than a lookup table alone, but also requires much less computation than a non-linear mapping of the color space.

Figure 3:
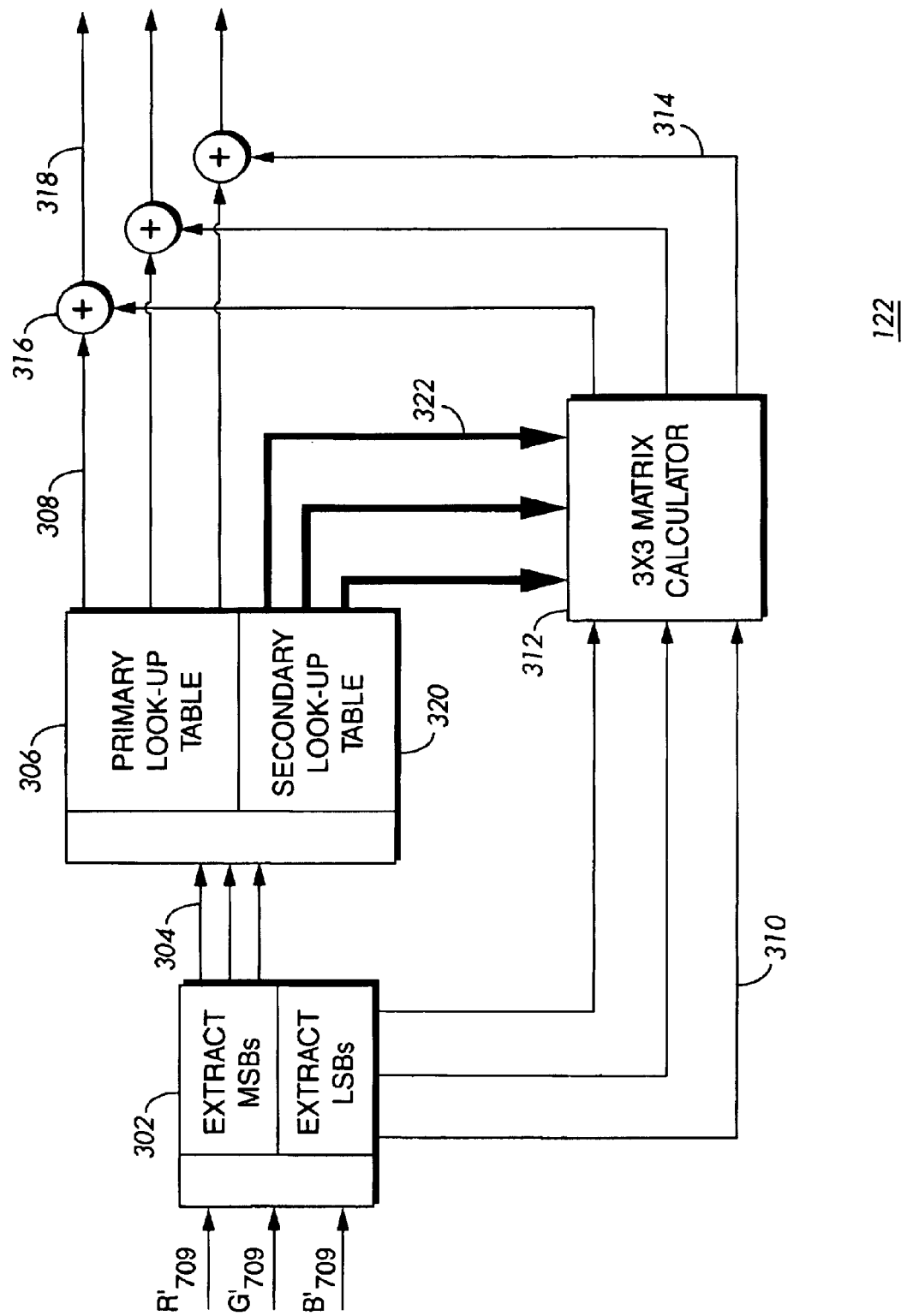
FIG. 3 is a block diagram of the color warping system of the present invention.

A block diagram of one embodiment of a color warping scheme 122 of the current invention is shown in FIG. 3. The three incoming signals, $R'_{709}$, $G'_{709}$, $B'_{709}$, are assumed to be in ITU Rec. 709 format. In this example, the signals are assumed to be 8-bit digital signals (i.e. represented by 8 binary digits), although it will be clear to those skilled in the art how the scheme may be modified for use with other digital signals. The first stage is an index generator, depicted by block 302, which extracts the 5 most significant bits (MSBs) of the signals, to be used as an index, and the remaining 3 least significant bit (LSBs) from each signal. For the example color, $R'_{709}$=220=0x11011100=0x11011000+0x100=216+4

$G'_{709}$=30=0x00011110=0x00011000+0x110=24+6

$B'_{709}$=45=0x00101101=0x00101000+0x101=40+5

The MSBs 304, which are (216,24,40) in the example, represent a nearby reference or anchor color and are used as indices to a primary look-up table 306. The table lists how each reference color is to be transformed. The look-up table has $2^{15}$=32K entries of 24 bits (3 bytes) each, for a total of 96K bytes. This is very much smaller than a full look-up table, which would require 48M bytes. A different number of bits may used to index the table, resulting in different sized tables. The lookup table provides an approximation 308 to the transformed color. The least significant bits 310 of the input color are used in a correction calculator 312 to calculate corrections 314. The corrections 314 are added to the approximations 308 at adders 316 to produce the transformed color signals $R'_L$, $G'_L$ and $B'_L$, 318.

The correction calculator uses coefficients 322 from a secondary look-up table 320. These coefficients are also indexed by the MSBs 304 of the input signals.

In contrast to prior transformation signals, the quantities used in the computations do not require extended precision. Thus, the color warping system of the present invention provides advantages over previous systems for both linear and non-linear transformations.

The operation of the correction calculator 312 will now be described.

Figure 4:
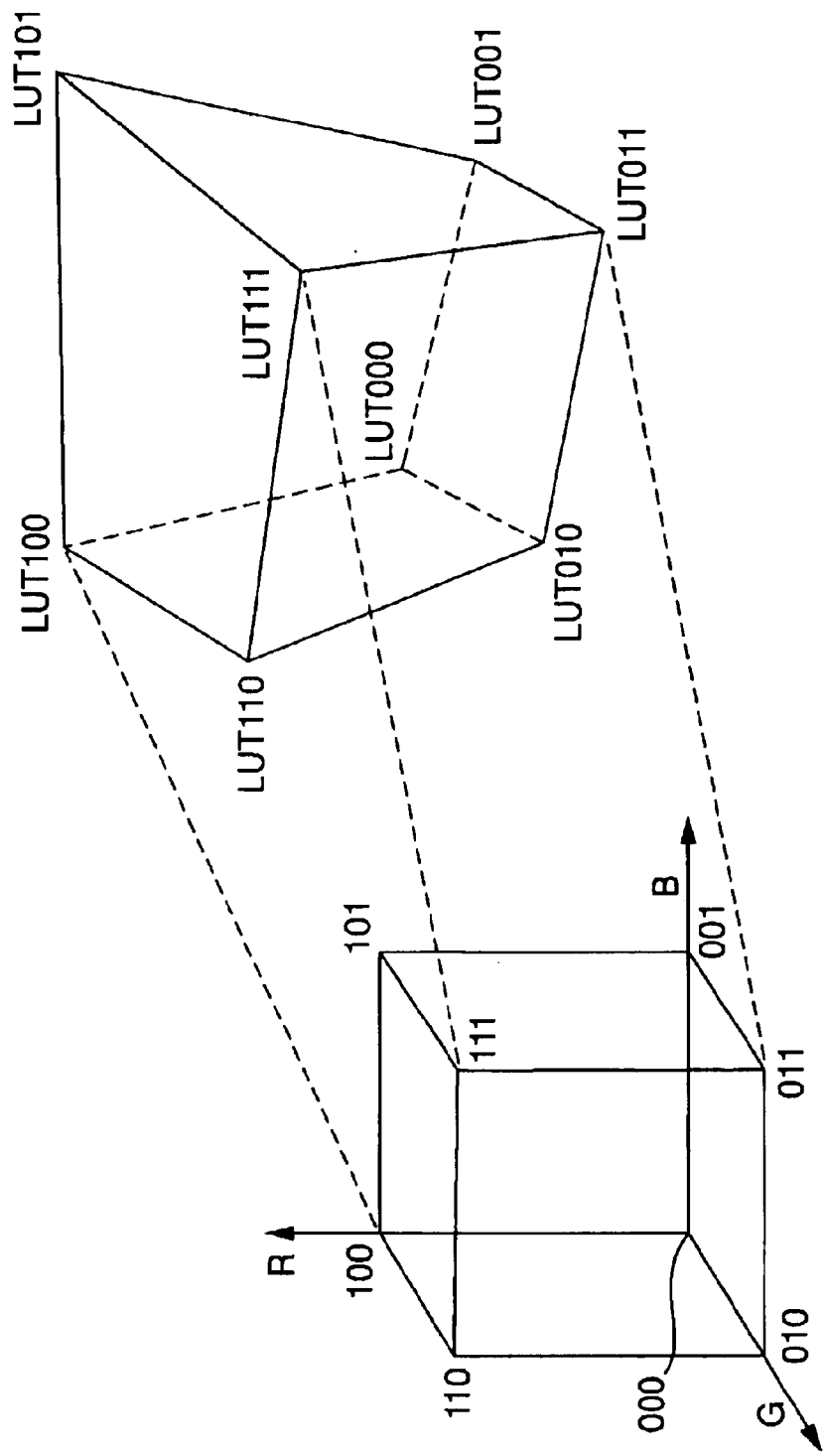
FIG. 4 is a pictorial representation of the transformation of one element of a color space.

FIG. 4 shows an example of how neighboring reference points are transformed. The cube labeled with vertices 000, 100, 010, 001, etc. represents the input reference points. The point labeled 000 is the reference index point corresponding to the MSBs of the input signal. The point labeled LUT000 is the corresponding primary look-up table (LUT) entry indexed by the MSBs of the input signal. LUT000 is the output point corresponding to the primary transformation of the input point 000. The neighboring reference points are transformed to the points LUT100, LUT010, LUT001, LUT101, LUT110, LUT011 and LUT111. In the example, the reference point (216,24,40) is transformed to LUT000, (224,24,40) is transformed to LUT100, (216,32,40) is transformed to LUT010, etc. The LSBs are labeled as r, g and b. The reference input point is transformed to the LUT000+ $\underline{F}$(r,g,b), where $\underline{F}$(r,g,b) is the correction. The correction to the red component is written as $F_r$(r,g,b), which takes the general form $$F_r(r, g, b) = a_r \frac{r}{8} + b_r \frac{g}{8} + c_r \frac{b}{8}$$

where $a_r$, $b_r$, and $c_r$ are coefficients. Introducing row vector coefficients, $\underline{a}$=($a_r,a_g,a_b$) etc., gives $$\underline{F}(r, g, b) = \underline{a} \frac{r}{8} + \underline{b} \frac{g}{8} + \underline{c} \frac{b}{8}.$$

The coefficients are determined so that when the input is close to a second reference point, the output is close to the output from the second reference point. This ensures that discontinuities in the overall approximation are kept to a minimum. If we use the correction formula to calculate the transformed signal at a neighboring reference output points we obtain, for example, with r=b=8 and g=0;

$LUT000_r+a_r+b_r.0+c_r=LUT101_r+e101_r$ where the subscript r denotes the red component and $e101_r$ denotes the error in the approximation. At the 7 neighboring reference points we have $LUT100_r+a_r=LUT100_r+e001_r$ $LUT010_r+b_r=LUT010_r+e010_r$ $LUT001_r+c_r=LUT001_r+e001_r$ $LUT110_r+a_r+b_r=LUT110_r+e110_r$ $LUT101_r+a_r+c_r=LUT101_r+e101_r$ $LUT011_r+b_r+c_r=LUT011_r+e011_r$ $LUT111_r+a_r+b_r+c_r=LUT111_r+e111_r$.

In the preferred embodiment, the coefficient vectors are chosen to minimize the errors at the reference points so that the discontinuities in the approximation are minimized. The error cannot be made zero. In one embodiment we can choose the coefficients to minimize a cost function. For example, if the cost function is the sum of squares of the errors, the best coefficients are given by $$\begin{bmatrix} a \\ b \\ c \end{bmatrix} = \frac{1}{8} \begin{bmatrix} 3 & -1 & -1 & 2 & 2 & -2 & 1 \\ -1 & 3 & -1 & 2 & -2 & 2 & 1 \\ -1 & -1 & 3 & -2 & 2 & 2 & 1 \end{bmatrix} * \begin{bmatrix} LUT100 - LUT000 \\ LUT010 - LUT000 \\ LUT001 - LUT000 \\ LUT110 - LUT000 \\ LUT101 - LUT000 \\ LUT011 - LUT000 \\ LUT111 - LUT000 \end{bmatrix}$$

The red components of the coefficients are given by, $$a_r = \frac{1}{8}(3LUT100_r - LUT010_r - LUT001_r + 2LUT110_r + 2LUT101_r - 2LUT011_r + LUT111_r) - \frac{1}{2}LUT000_r$$

$$b_r = \frac{1}{8}(-LUT100_r + 3LUT010_r - LUT001_r + 2LUT110_r - 2LUT101_r + 2LUT011_r + LUT111_r) - \frac{1}{2}LUT000_r$$

$$c_r = \frac{1}{8}(-LUT100_r - LUT010_r + 3LUT001_r - 2LUT110_r + 2LUT101_r + 2LUT011_r + LUT111_r) - \frac{1}{2}LUT000_r$$

These 9 coefficients (3 rows of 3 columns) may be pre-calculated and stored in the secondary look-up table 320. The correction is given by the matrix multiplication $$F(r, g, b) = \begin{bmatrix} \frac{r}{8} & \frac{g}{8} & \frac{b}{8} \end{bmatrix} * \begin{bmatrix} a_r & a_g & a_b \\ b_r & b_g & b_b \\ c_r & c_g & c_b \end{bmatrix}.$$

Figure 5:
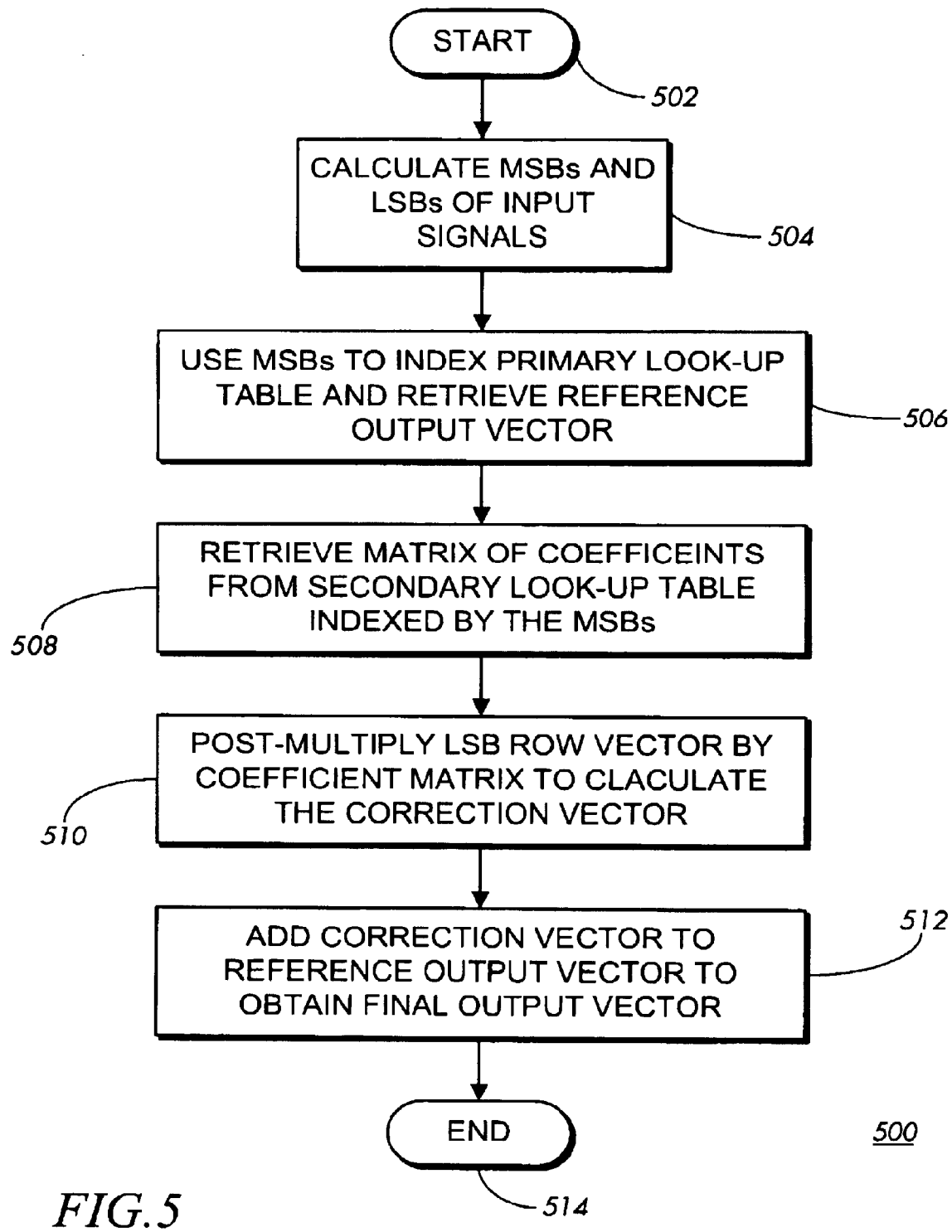
FIG. 5 is a flow chart of the color warping method of the present invention

This sequence of computations is illustrated in the flowchart 500 of FIG. 5. After start block 502, the MSBs and LSBs of the input signals are calculated at block 504. The MSBs are used to index the primary look-up table and retrieve the reference output vector at block 506. The matrix of coefficients is retrieved from the secondary look-up table, indexed by the MSBs, at block 508. At block 510, the LSB row vector $$\begin{bmatrix} \frac{r}{8} & \frac{g}{8} & \frac{b}{8} \end{bmatrix}$$

is post-multiplied by the coefficient matrix to calculate the correction vector, and, at block 512, the correction vector is added to the reference output vector to obtain the final output vector. The process is terminated at block 514.

If memory is at a greater premium than computation, the coefficients can be calculated as needed, since they depend upon output values already stored in the primary look-up table.

In a further embodiment, the coefficients are chosen to provide exact interpolation to a subset of the neighboring reference points. For example, if the correction is exact at the points LUT000, LUT110, LUT101 and LUT011, the red components of the coefficient vectors satisfy $$LUT110_r + a_r + b_r = LUT110_r + e110_r$$

$$LUT101_r + a_r + c_r = LUT101_r + e101_r$$

$$LUT011_r + b_r + c_r = LUT011_r + e011_r$$

In matrix form, this is written as $$\begin{bmatrix} 1 & 1 & 0 \\ 1 & 0 & 1 \\ 0 & 1 & 1 \end{bmatrix} \begin{bmatrix} a \\ b \\ c \end{bmatrix} = \begin{bmatrix} LUT110 - LUT000 \\ LUT101 - LUT000 \\ LUT011 - LUT000 \end{bmatrix}.$$

The coefficient vectors are therefore given by $$a = \frac{1}{2}(LUT110 + LUT101 - LUT011 - LUT000)$$

$$b = \frac{1}{2}(LUT110 - LUT101 + LUT011 - LUT000)$$

$$c = \frac{1}{2}(-LUT110 + LUT101 + LUT011 - LUT000).$$

The coefficients described above are given as examples; other choices of coefficients will be clear to those skilled in the art. For example, we could have $$a_r = (LUT111_r - LUT011_r), b_r = (LUT010_r - LUT000_r), c_r = (LUT001_r - LUT000_r)$$

$$a_g = (LUT111_g - LUT101_g), b_g = (LUT001_g - LUT000_g), c_g = (LUT100_g - LUT000_g)$$

$$a_b = (LUT111_b - LUT110_b), b_b = (LUT100_b - LUT000_b), c_b = (LUT010_b - LUT000_b)$$

The advantage of this solution is that the look-up table memory is significantly reduced in size and the contents may be defined in a non-linear manner. Shades of white and flesh tones are mapped accurately, while those colors that lie near the peripheral of the CRT color gamut can be mapped to colors outside of the CRT color gamut. In this way, video intended for display on a CRT can be displayed on a laser light system with correct colors within any defined region and extended color gamut outside of the defined region.

If 10-bit color data is used, the table may be, for example, indexed by the 6-MSBs and the correction calculated from the 4-LSBs. In this case, the coefficients may be defined as 4-bit values to increase accuracy.

In general, if N-bit data is used, the table may be indexed by the M MSBs, where M<N and the correction calculated from the N-M LSBs.

In a further embodiment, each input signal is rounded to the nearest 5-bit number rather than truncated to the 5-MSBs. Rounding may be achieved by adding 0×100 to the values before truncation. The maximum values of the residual signals, r, g and b, are then smaller. Consequently, the discontinuities in the approximation are reduced. Conversely, the same level of discontinuity is obtained from smaller look-up tables. The technique described can still be used, but the coefficients will be calculated from intermediate reference points, rather than the reference points in the primary look-up table.

It will be apparent to those skilled in the art that more sophisticated interpolation functions may be used, including non-linear interpolation functions. In general, for a given level of discontinuity, there is a compromise between the size of the look-up and the complexity of the correction calculation.

While the invention has been particularly shown and described with reference to a preferred embodiment, it will be understood by those skilled in the art that various changes in form and detail may be made therein without departing from the spirit and scope of the invention.

What is claimed is:

1. A method for transforming a vector of input components (R,G,B) conforming to ITU srecification Rec. 709 for display on a CRT display of an input color to an output color suitable for display on a laser display having a greater gamut of colors than the CRT display, said method comprising:

generating a table index using said vector of input components, said table index corresponding to a reference input color $(R_0, G_0, B_0)$;

retrieving a vector of reference output components from a primary look-up table stored in a first memory using said table index, wherein the vector of reference output components from the primary look-up table are established so that colors within a defined region are accurately mapped from (R,G,B) to $(R_0, G_0, B_0)$, while other colors are mapped to an extended color gamut outside the defined region for display on the laser display;

retrieving a matrix M of coefficients from a secondary look-up table stored in a second memory using said table index;

generating a vector of difference components (r,g,b) representing the difference between said vector of input components (R,G,B) and said reference input color $(R_0, G_0, B_0)$;

calculating a vector of correction components F(r,g,b) using said vector of difference components and said matrix of coefficients; and adding said vector of correction components to said vector of reference output components to obtain a vector of final output components of the output color.

2. A method as in claim 1 in which each input component of said vector of input components is represented by fixed number N of binary digits (bits) and in which generating a table index comprises selecting the M most significant bits of each input component, where M<N.

3. A method as in claim 2 in which generating the vector of difference components comprises selecting the N-M least significant bits of each input component.

4. A method as in claim 1 in which said reference output components are the transformations of said reference input coefficients.

5. A method as in claim 1 in which said transformation is a non-linear transformation.

6. A method as in claim 1 in which said vector of input components and said vector of final output components are gamma modified.

7. A method as in claim 1 in which said vector of correction components is calculated as $$F(r,g,b)=[r,g,b]*M$$

where said matrix M of coefficients has three rows and three columns.

8. A method as in claim 1 in which said matrix M of coefficients is determined from a plurality of vectors of reference output components.

9. A method as in claim 1 in which said matrix M of coefficients is chosen to minimize discontinuities in the transformation.

10. A method as in claim 1 in which each component of said vector of input components is represented by fixed number N of binary digits (bits) and in which generating a table index comprises rounding each component to the M most significant bits, where M<N, to select the nearest reference input color $(R_0, G_0, B_0)$.

11. A method as in claim 1 in which the step of generating a vector of difference components (r,g,b) comprises subtracting the vector of components of the nearest reference input color from the components of the input color, so that $$(r,g,b)=(R,G,B)-(R_0,G_0,B_0).$$

12. A color transformation system for transforming a vector of input components (R,G,B) conforming to ITU specification Rec. 709 for display on a CRT display of an input color to an output color suitable for display on a laser display having a greater gamut of colors than the CRT display, comprising:

a primary look-up table stored in a first memory containing vectors of reference output components indexed by a table index, wherein the vectors of reference output components from the primary look-up table are established so that colors within a defined region are accurately mapped from (R,G,B) to $(R_0, G_0, B_0)$, while other colors are mapped to an extended color gamut outside the defined region for display on the laser display;

a secondary look-up table stored in a second memory and containing matrices of coefficients indexed by said table index;

an index generator for receiving a vector of input components (R,G,B) representing an input color and generating a table index value corresponding to a reference input color $(R_0, G_0, B_0)$ and a vector of difference components (r,g,b) representing the difference between said vector of input components (R,G,B) and said reference input color $(R_0, G_0, B_0)$;

a correction calculator responsive to said vector of difference components (r,g,b) and to a matrix of coefficients indexed by said table index value, and generating a vector of correction components F(r,g,b); and an adder for combining a vector of reference output components $T(R_0, G_0, B_0)$ indexed by said table index value to said vector of correction components F(r,g,b) to obtain a vector of transformed input components $T(R,G,B)=T(R_0,G_0,B_0)+F(r,g,b)$.

13. A system as in claim 12 in which each input component of said vector of input components is represented by fixed number N of binary digits (bits) and in which said table index comprises the M most significant bits of each input component, where M<N.

14. A system as in claim 13 in which each of said vectors of reference output components is stored in the memory as three M-bit numbers.

15. A system as in claim 13 in which each element of each of said matrices of coefficients is stored in the memory as an (N-M)-bit number.

16. A system as in claim 13 in which N=8 and M=5.

17. A system as in claim 13 in which N=10 and M=6.

18. A digital video system for transforming a vector of input components (R,G,B) conforming to ITU specification Rec. 709 for display on a CRT display of an input color to an output color suitable for display on a laser display having a greater gamut of colors than the CRT display, comprising:

an input element for receiving an input video signal;

a converter for converting said input video signal in a digital video signal in which each pixel is represented as a vector of input components representing primary color weightings for a first display format;

a color transformer for transforming said vector of input components into a vector of output components representing primary color weightings for a second display format, and display for receiving said second vector of components and causing the color represents by said vector of output components to be displayed, wherein said color transformer comprises:

a primary look-up table stored in a memory containing vectors of reference output components indexed by a table index, wherein the vectors of reference output components from the primary look-up table are established so that colors within a defined region are accurately mapped to output reference colors, while other colors are mapped to an extended color gamut outside the defined region for display on the laser display;

a secondary look-up table stored in a memory and containing matrices of coefficients indexed by said table index;

an index generator for receiving said vector of input components and generating a table index value corresponding to a reference input color and a vector of difference components representing the difference between said vector of input components and said reference input color;

a correction calculator responsive to said vector of difference components and to a matrix of coefficients indexed by said table index value, and generating a vector of correction components; and an adder for combining a vector of reference output components indexed by said table index value to said vector of correction components to obtain a vector of transformed input components.

19. A system as in claim 18 in which said second display format comprises the amounts of monochromatic colors red, green and blue provided by red, green and blue lasers.

20. A system as in claim 18 in which the defined region comprises shades of white or shades of flesh tones or both.

21. A system as in claim 1 in which the defined region comprises shades of white or shades of flesh tones or both.

22. A system as in claim 12 in which the defined region comprises shades of white or shades of flesh tones or both.

* * * * *